UNITED STATES PATENT OFFICE.

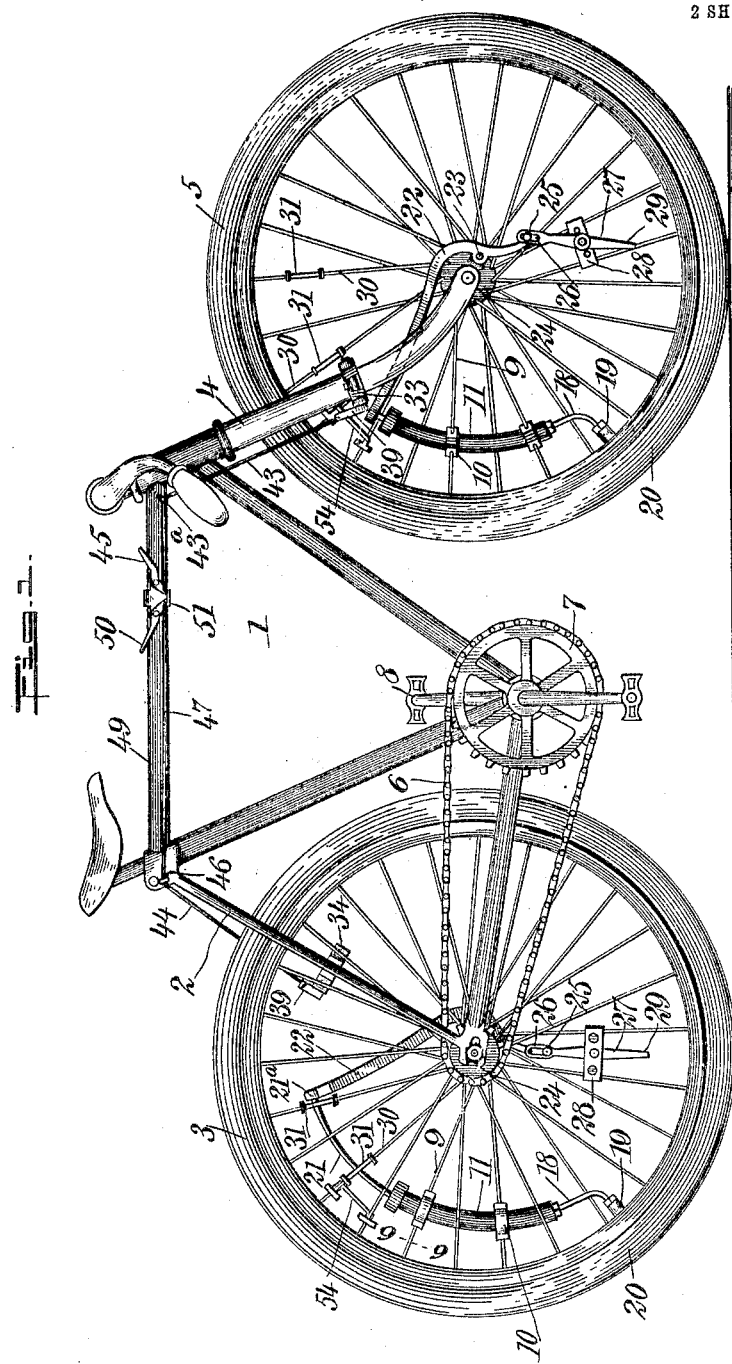

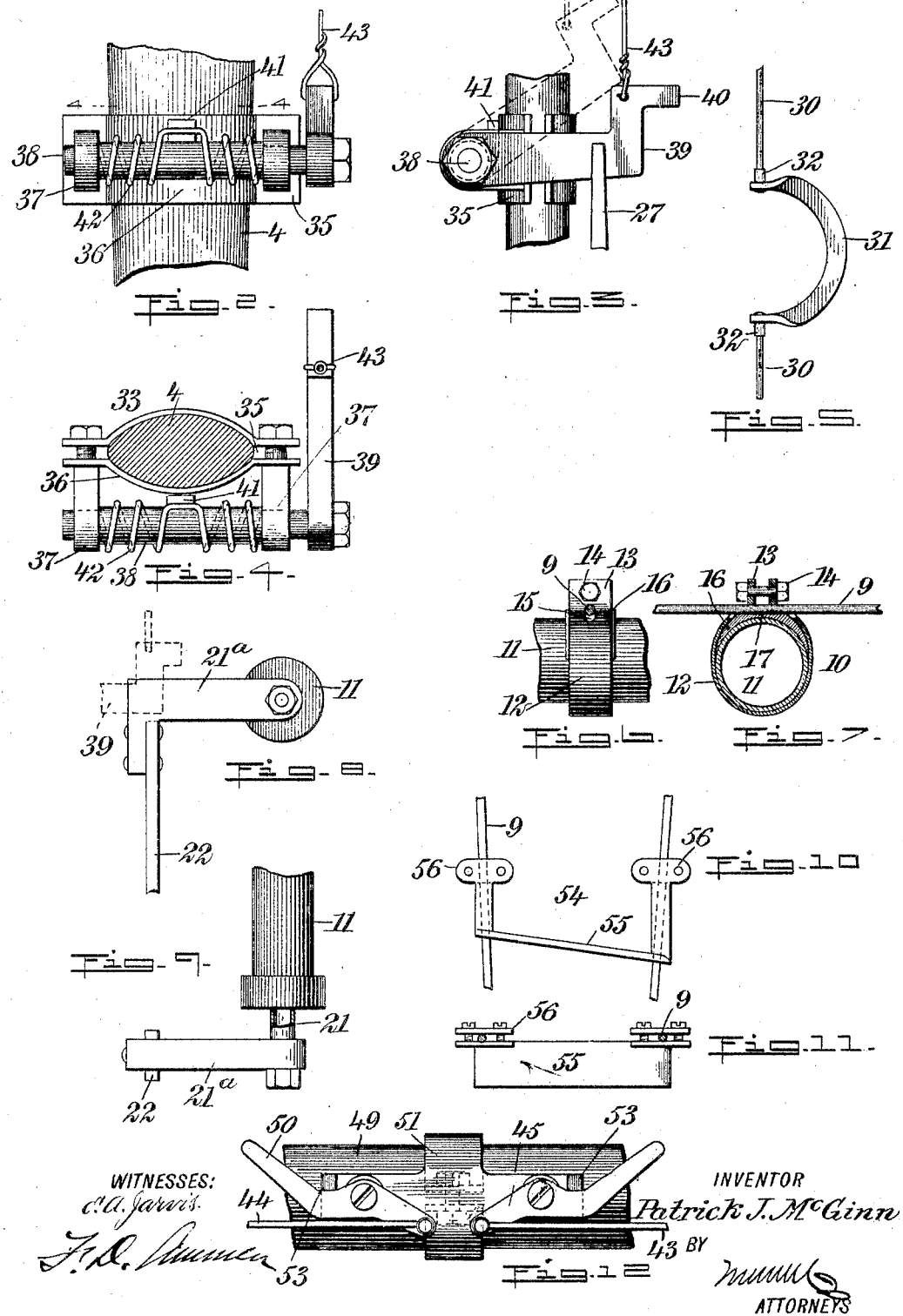

PATRICK JOSEPH McGINN, OF BULAWAYO, MATABELELAND, SOUTH AFRICA.

AUTOMATIC CYCLE-PUMP.

No. 802,774. Specification of Letters Patent. Patented Oct. 24, 1905.

Application filed February 11, 1905. Serial No. 245,236.

*To all whom it may concern:*

Be it known that I, PATRICK JOSEPH MC-GINN, a subject of the King of Great Britain, and a resident of Bulawayo, Matabeleland, South Africa, have invented a new and Improved Automatic Cycle-Pump, of which the following is a full, clear, and exact description.

This invention relates to means for inflating pneumatic tires. Its object is to produce a construction which is incorporated with the wheel of a vehicle and which will operate automatically to inflate the pneumatic tire of the wheel as the wheel rotates.

Reference is to be had to the accompanying drawings, forming a part of this specification, in which similar characters of reference indicate corresponding parts in all the figures.

Figure 1 is a side elevation of a bicycle to which my invention has been applied. Fig. 2 is a side elevation of a portion of the front fork of the bicycle, representing in detail a part of the pump-operating mechanism. Fig. 3 is a front elevation of the parts shown in Fig. 2. Fig. 4 is a horizontal section taken substantially upon the line 4 4 of Fig. 2. Fig. 5 is a perspective representing the manner in which I adapt certain spokes of the wheel to the purpose of my invention. Fig. 6 is a section taken substantially upon the line 6 6 of Fig. 1 and looking toward the center of the wheel, showing a portion of the pump cylinder or body in order to illustrate the manner of attaching the same to the spokes of the wheel. Fig. 7 is a vertical section taken substantially centrally through the construction shown in Fig. 6. Fig. 8 is an end elevation of the pump, showing a cross-head for operating the piston thereof in connection with a portion of an actuating-lever. Fig. 9 is a plan of the parts shown in Fig. 8. Fig. 10 is a side elevation of a trip plate or bracket which is attached to the spokes of the wheel for a purpose which will appear more fully hereinafter. Fig. 11 represents this trip-bracket in plan, the spokes being shown in section; and Fig. 12 is a rear elevation of a clip which is adapted to be attached to the handle-bars carrying levers which control the inflating devices. This view shows a portion of the handle-bars and the frame of the bicycle.

Before proceeding with a detailed description of the invention it may facilitate the disclosure to state that the device or invention is preferably constructed substantially in duplicate or in two distinct mechanisms, which are used, respectively, in connection with the forward or rear wheels when the invention is applied to an ordinary bicycle, the only difference residing in the form of a clip attached to the bicycle-fork. This difference of form of the clip is due to the difference of form of the forward and rear forks.

Referring more particularly to the parts, 1 represents the frame of an ordinary bicycle of the common type known as a "diamond-frame," said frame including a rear fork 2, which leads downwardly from the seat-post to the center of the rear wheel 3, and a forward fork 4, which leads forwardly from the head to the center of the forward wheel 5. The rear wheel 3 is driven in the usual manner by means of a sprocket-chain 6 passing over the main sprocket-wheel 7, which is actuated by pedals 8 of the usual construction.

In applying my invention I provide a pair of contiguous spokes 9 of each wheel with clamps 10. The construction of one of these clamps is very clearly shown in Figs. 6 and 7. They are of course for the purpose of attaching the body 11 of the pump. They comprise resilient bands 12, which encircle the body of the pump, as indicated, and they are provided with oppositely-disposed ears 13 through which a clamping-bolt 14 passes. Near the bases of the ears 13 the band 12 is provided with oppositely-disposed openings 15, through which the spoke 9 passes, as indicated. Between the spoke and the body 11 of the pump saddles 16 are provided, which consist of tapering plates having substantially the form of a crescent, as indicated most clearly in Fig. 7, the outer face of each plate, which is disposed against the spoke, being provided with a groove 17, which receives the spoke and alines substantially with the aforesaid openings 15, as will be readily understood. In applying the clamps they are attached in such manner as to support the pump between the sets of spokes. The pumps are not of ordinary or common form, but are curved, as indicated, so that their axes lie substantially upon an arc of a circle. From each pump a suitable connection 18 leads to the inflating-nipple 19 of the tires 20. The piston-rods 21 of the pumps are curved to correspond with the shape of the pump-bodies, as will be readily understood, so that when the piston is extended from the pump it will project itself along the arc of a circle.

As indicated most clearly in Figs. 8 and 9, in connection with each piston there is a cross-head 21ª, and each cross-head is attached to the extremity of a curved main lever 22, which lever is pivoted at 23 to the hub 24 of the wheel. (See Fig. 1.) The lever 22 extends beyond the pivot-point 23 and terminates in a pin 25, which is received in a slot 26, as shown, the said slot being formed at the extremity of a trip-lever 27. This trip-lever 27 is pivotally mounted upon a spoke-clip 28, which attaches rigidly to the spokes in any suitable manner. From this arrangement it should now be understood that if the outer extremity 29 of the trip-lever 27 is rotated to and fro it would operate through its corresponding main lever 22 to actuate the pump carried by that wheel. The valve arrangement of the pump would be the same as ordinarily employed in pumps of this kind.

In order to make provision for clearance between the spokes and the cross-head 21, I provide, as necessary, certain spokes 30 with yokes 31. One of these spokes, with its yoke, is very clearly shown in Fig. 5, which yoke consists, substantially, of a half-ring provided at its extremities with sockets 32, which receive the ends of the spoke-sections, as indicated.

Arrangement is made for automatically operating the trip-levers 27. To this end the forward fork 4 is provided with a clip 33, and the rear fork 2 is provided with a clip 34. The construction of these clips is substantially similar, except that they are modified as to form so as to adapt them especially to the fork to which they are attached. The construction of the forward clip 33 and its contiguous parts will now be described. This clip is most clearly illustrated in Figs. 2 to 4. It consists, substantially, of a clamp 35, adapted to attach to one prong of the fork 4, as indicated, the body 36 of the clamp being provided with outwardly-projecting ears 37, rotatably supporting the spindle or shaft 38. This shaft rigidly carries an arm 39, which may project inwardly across the forward edge of the fork, as indicated most clearly in Fig. 3. The inner extremity of the arm 39 is preferably offset upwardly, so as to present an elevated extension 40. When the arm 39 occupies the position in which it is shown in Fig. 3, it lies in the path of the cross-head 21ª, as indicated most clearly in Fig. 8. From this arrangement it should be readily understood that the arm 39 will operate automatically when the wheel rotates, so as to force the piston inwardly with respect to the pump. The body of the arm 39 affords means for actuating the trip-lever 27, in the path of which it lies, as indicated most clearly in Fig. 3. The spindle 38 is provided, substantially at its middle point, with a stop or projection 41, which engages the outer side of the body 36 of the clamp, so as to support the arm 39 in substantially the position in which it is shown in Fig. 3. A coiled spring 42 is employed, preferably disposed about the spindle 38, and this spring operates to resist an upward movement of the inner extremity of the arm 39. The arms 39 of the clips 33 and 34 are controlled by wires 43 44. The wire 43 leads upwardly along the front fork 4, through an eye 43ª, to a lever 45. The wire 44 leads to a point adjacent to the seat-post, where it is passed through an eye 46, and then runs horizontally, as shown at 47, near the side of the upper bar 49 of the frame 1 and is connected with a lever 50, substantially similar to the lever 45. These controlling-levers 45 and 50 are preferably pivotally mounted on a suitable clip 51, attached to the bar 49 at a convenient point. The levers are normally in the position in which they are shown in Fig. 12, at which time they will support the arm 39 in an elevated position, such as that indicated in dotted outlines in Fig. 3. In this way the arm may be removed from the path of the cross-head and the trip-lever. In connection with the clip 51 nibs or catches 53 are provided, the lower edges of which are engaged by the levers, so that they may prevent the arms 39 from being returned to their operative position by the force of their springs.

In order to make provision for throwing the arms 39 out of the path of the cross-head, so as to allow the same to pass after the piston has been returned to its innermost position, I arrange a trip-bracket 54, which attaches to the wheel in the manner indicated in Figs. 10 and 11. The body of this bracket consists of a plate 55, which is disposed at an inclination, as shown. By means of the clip-plates 56 this bracket is attached at a suitable point adjacent to the forward extremity of the pump-body with reference to the direction of rotation. The bracket is so placed that the upper face of the plate 55 will strike against the under side of the extension 40 and throw the same upwardly, allowing the cross-head to pass under the same, as will be readily understood.

By reason of the yokes 31, which are used in connection with certain of the spokes in the manner described, I am enabled to give the pump a long stroke, which increases its efficiency and usefulness.

From a study of the construction described it should be evident that my invention or parts of the same may be readily applied to wheels of almost any construction, the mechanical design of the devices being altered, if necessary, without departing from the scope of the invention, and while I have illustrated the invention as applied to a bicycle it could of course be applied equally as well to automobiles or other vehicles having pneumatic tires.

Having thus described my invention, I claim as new and desire to secure by Letters Patent—

1. A wheel having a pneumatic tire, in combination with a pump carried by said wheel, a main lever adapted to actuate said pump, a trip-lever making a sliding connection with said main lever, and automatic means for actuating said trip-lever.

2. A wheel having a pneumatic tire, in combination with a pump carried by said wheel, mechanism for actuating said pump upon rotating said wheel, a movable arm which may be projected into the path of said mechanism, and automatic means for drawing said arm out of said path.

3. A wheel having a pneumatic tire, in combination with a pump carried by said wheel, mechanism for actuating said pump, a movable arm which may be projected into the path of said mechanism, and a trip-bracket carried by said wheel and adapted to throw said arm out of said path.

4. A wheel having a pneumatic tire, in combination with a pump for inflating said tire, the axis of said pump being disposed upon an arc, a piston-rod constituting a part of said pump, a cross-head attached to said piston-rod, a main lever attached to said cross-head, a trip-lever making a sliding connection with said main lever and adapted to actuate the same, and a movable arm adapted to engage said cross-head and said trip-lever.

5. A wheel having a pneumatic tire, in combination with a pump for inflating said tire, the axis of said pump being disposed upon an arc, a piston-rod constituting a part of said pump, a cross-head attached to said piston-rod, a main lever attached to said cross-head, a trip-lever making a sliding connection with said main lever and adapted to actuate the same, a movable arm adapted to engage said cross-head and said trip-lever, and means for withdrawing said arm.

6. A wheel having a pneumatic tire, in combination with a pump for inflating said tire, the axis of said pump being disposed upon an arc, a piston-rod constituting a part of said pump, a cross-head attached to said piston-rod, a main lever attached to said cross-head, a trip-lever making a sliding connection with said main lever and adapted to actuate the same, a movable arm adapted to engage said cross-head and said trip-lever, and a trip-bracket carried by said wheel and presenting an inclined face adapted to deflect said arm.

7. A wheel having a pneumatic tire, in combination with a pump carried by said wheel, said pump including a reciprocating member moving in a path transverse with respect to said spokes, the said spokes which lie adjacent to said path comprising yokes and having sections attached to said yokes.

8. A wheel having a pneumatic tire, and spokes, in combination with a pump, means for attaching said pump to said spokes, said pump including a piston-rod adapted to move transversely of said spokes, the spokes adjacent to the path of said piston-rod being formed in sections and having a yoke connecting said sections.

9. A bicycle having wheels with pneumatic tires, pumps carried by said wheels, clips carried by the forward and rear forks of said bicycle and having arms adapted to actuate said pumps, lines leading from said arms, and levers to which said lines attach for controlling said arms.

10. A pump comprising a body, clamps adapted to support said body, means for attaching said clamps to the spokes of a wheel, said pump having a piston, a lever connected with said piston and adapted to attach pivotally to the hub of said wheel, means in connection with said lever for actuating the same, and a member adapted to be attached adjacent to said wheel and adapted to operate said pump as the wheel rotates.

In testimony whereof I have signed my name to this specification in the presence of two subscribing witnesses.

PATRICK JOSEPH McGINN.

Witnesses:
C. F. WEBB,
G. M. KIRSCHBAUM.